(12) United States Patent
Dufort et al.

(10) Patent No.: US 9,925,930 B1
(45) Date of Patent: Mar. 27, 2018

(54) REMOVABLE APPARATUS FOR ORNAMENTING AUTOMOBILES

(76) Inventors: Melissa Beth Dufort, Shawnee, KS (US); Peter John Dufort, Shawnee, KS (US)

( * ) Notice: Subject to any disclaimer, the term of this patent is extended or adjusted under 35 U.S.C. 154(b) by 1202 days.

(21) Appl. No.: 13/523,496

(22) Filed: Jun. 14, 2012

(51) Int. Cl.
*B60R 13/00* (2006.01)
*B60R 13/04* (2006.01)

(52) U.S. Cl.
CPC ............ *B60R 13/005* (2013.01); *B60R 13/04* (2013.01)

(58) Field of Classification Search
CPC ....... G09F 21/048; B60R 13/00; B60R 13/04; B60R 13/005
USPC .............................. 428/31; 116/28 R; 40/591
See application file for complete search history.

(56) References Cited

U.S. PATENT DOCUMENTS

| | | | |
|---|---|---|---|
| 2,093,951 A | | 9/1937 | Bosket |
| D134,309 S | | 11/1942 | Robinson |
| 2,301,834 A | | 11/1942 | Whaley |
| 2,620,579 A | | 12/1952 | Dienes |
| 3,260,486 A | * | 7/1966 | Groff ........................... 248/539 |
| 3,357,662 A | | 12/1967 | Peterson |
| 4,002,138 A | * | 1/1977 | Dobala ........................ 116/28 R |
| 4,582,017 A | | 4/1986 | Ostermiller |
| 4,590,883 A | * | 5/1986 | Steed et al. ................... 116/173 |
| D300,617 S | | 4/1989 | Baker |
| 4,928,954 A | * | 5/1990 | Levine et al. .................. 472/57 |
| 5,549,940 A | | 8/1996 | Noone |
| 6,010,107 A | * | 1/2000 | Goldfarb ........................ 248/512 |
| 7,178,280 B1 | * | 2/2007 | Passmore ........................ 40/591 |
| 7,454,853 B2 | * | 11/2008 | Taylor ............................. 40/591 |
| 7,757,417 B1 | | 7/2010 | Koski et al. |
| 8,613,258 B1 | * | 12/2013 | Barry et al. ................ 116/28 R |
| 2002/0162258 A1 | | 11/2002 | Anderson et al. |
| 2005/0263060 A1 | * | 12/2005 | Armstrong .................. 116/28 R |
| 2007/0044207 A1 | | 3/2007 | Herman |
| 2007/0124972 A1 | | 6/2007 | Ratcliffe |

* cited by examiner

*Primary Examiner* — Nikki H. Dees
*Assistant Examiner* — Stephanie A Cox
(74) *Attorney, Agent, or Firm* — Lathrop Gage LLP

(57) ABSTRACT

Removable apparatus for ornamenting automobiles are disclosed. One removable automobile-ornamenting apparatus includes an attachment portion having: (a) a first attachment device having a first arm with proximal and distal ends; (b) an anchor at the first arm distal end; and (c) a second attachment device. An ornamental portion is operatively coupled to the first and second attachment devices. The first attachment device and the second attachment device are configured such that: (a) in a first method of use, the first arm is between a hood or a rear door of an automobile and a remainder of the automobile and the second attachment device is located below the first arm; and (b) in a second method of use, the first arm is between the hood or the rear door of the automobile and the remainder of the automobile and the second attachment device is located above the first arm.

11 Claims, 8 Drawing Sheets

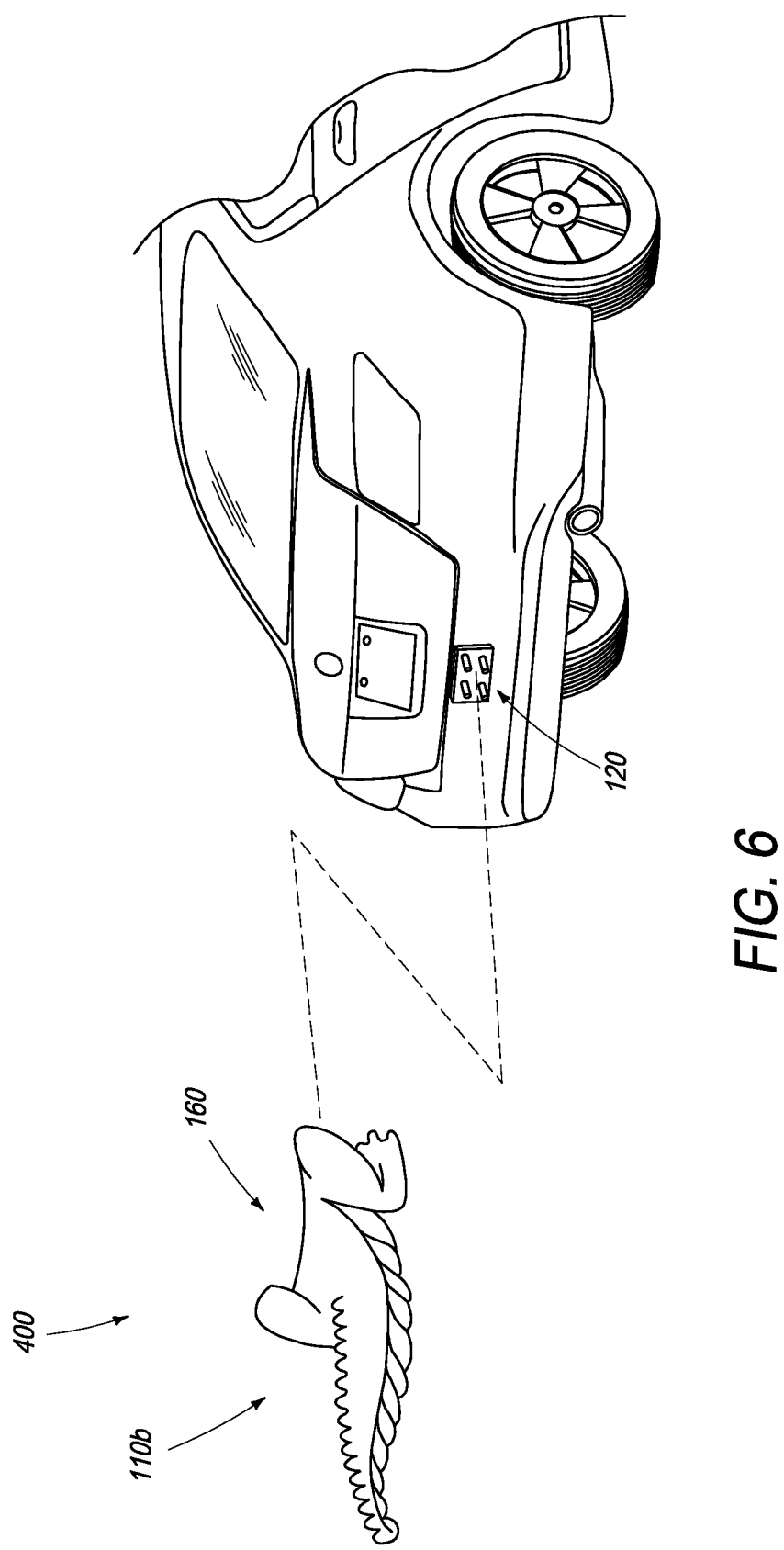

US 9,925,930 B1

REMOVABLE APPARATUS FOR ORNAMENTING AUTOMOBILES

BACKGROUND

The disclosed subject matter is directed to removable apparatus for ornamenting automobiles. Removable ornamentation for automobiles may be desirable for various purposes. For example, fans of athletic teams may want to show team allegiance—and particularly when traveling to, or tailgating at, a sporting event. Or business owners may want to advertise using a company (or employee) automobile, or identify an automobile and its driver as affiliated with the business. Indeed, reasons for ornamenting automobiles may vary greatly. However, many automobile owners do not want ornamentation to be permanently affixed to their automobile.

SUMMARY

Removable apparatus for ornamenting automobiles are disclosed herein. In one embodiment, a removable automobile-ornamenting apparatus includes an attachment portion and an ornamental portion. The attachment portion includes: (a) a first attachment device having a first arm with proximal and distal ends; (b) an anchor at the first arm distal end; and (c) a second attachment device. The ornamental portion is operatively coupled to the first attachment device and the second attachment device. The first attachment device and the second attachment device are configured such that: (a) in a first method of use, the first arm is between a hood or a rear door of an automobile and a remainder of the automobile and the second attachment device is located below the first arm; and (b) in a second method of use, the first arm is between the hood or the rear door of the automobile and the remainder of the automobile and the second attachment device is located above the first arm.

In another embodiment, a removable automobile-ornamenting apparatus includes an attachment portion and an ornamental portion. The attachment portion includes: (a) a first arm having proximal and distal ends; (b) a first anchor at the first arm distal end; (c) a second arm having proximal and distal ends; (d) a second anchor at the second arm distal end; and (e) a suction member. The ornamental portion is operatively coupled to the first arm proximal end, the second arm proximal end, and the suction member. A ballast is in at least one item selected from the group consisting of the attachment portion and the ornamental portion. The first arm and the second arm are respectively configured for coupling the ornamental portion to an automobile through a friction fit between: (a) a hood or a rear door of an automobile; and (b) another portion of the automobile. The first anchor has a cross-sectional area sized to prevent the ornamental portion from undesirably separating from the automobile if the friction fit of the first arm is undesirably overcome, and the second anchor has a cross-sectional area sized to prevent the ornamental portion from undesirably separating from the automobile if the friction fit of the second arm is undesirably overcome.

In still another embodiment, a removable automobile-ornamenting apparatus includes a first attachment portion, a first ornamental portion, a second attachment portion, and a second ornamental portion. The first attachment portion includes: (a) a first arm having proximal and distal ends; (b) a first anchor at the first arm distal end; (c) a second arm having proximal and distal ends; and (d) a second anchor at the second arm distal end. The first ornamental portion is operatively coupled to the first arm proximal end and the second arm proximal end. The second attachment portion includes: (a) a third arm having proximal and distal ends; (b) a third anchor at the third arm distal end; (c) a fourth arm having proximal and distal ends; and (d) a fourth anchor at the fourth arm distal end. The second ornamental portion is operatively coupled to the third arm proximal end and the fourth arm proximal end. The first arm and the second arm are respectively configured for coupling the first ornamental portion to an automobile through a friction fit between: (a) a hood of an automobile; and (b) another portion of the automobile. The first anchor has a cross-sectional area sized to prevent the first ornamental portion from undesirably separating from the automobile if the friction fit of the first arm is undesirably overcome, and the second anchor has a cross-sectional area sized to prevent the first ornamental portion from undesirably separating from the automobile if the friction fit of the second arm is undesirably overcome. The third arm and the fourth arm are respectively configured for coupling the ornamental portion to an automobile through a friction fit between: (a) a rear door of the automobile; and (b) another portion of the automobile. The third anchor has a cross-sectional area sized to prevent the second ornamental portion from undesirably separating from the automobile if the friction fit of the third arm is undesirably overcome, and the fourth anchor has a cross-sectional area sized to prevent the second ornamental portion from undesirably separating from the automobile if the friction fit of the fourth arm is undesirably overcome.

BRIEF DESCRIPTION OF THE DRAWINGS

FIG. 6 is a perspective view of a rearward section of still another removable apparatus for ornamenting automobiles, according to an embodiment, with an attachment portion coupled to an automobile and an ornamentation portion separated from the attachment portion for illustration.

DETAILED DESCRIPTION

Figure 1:
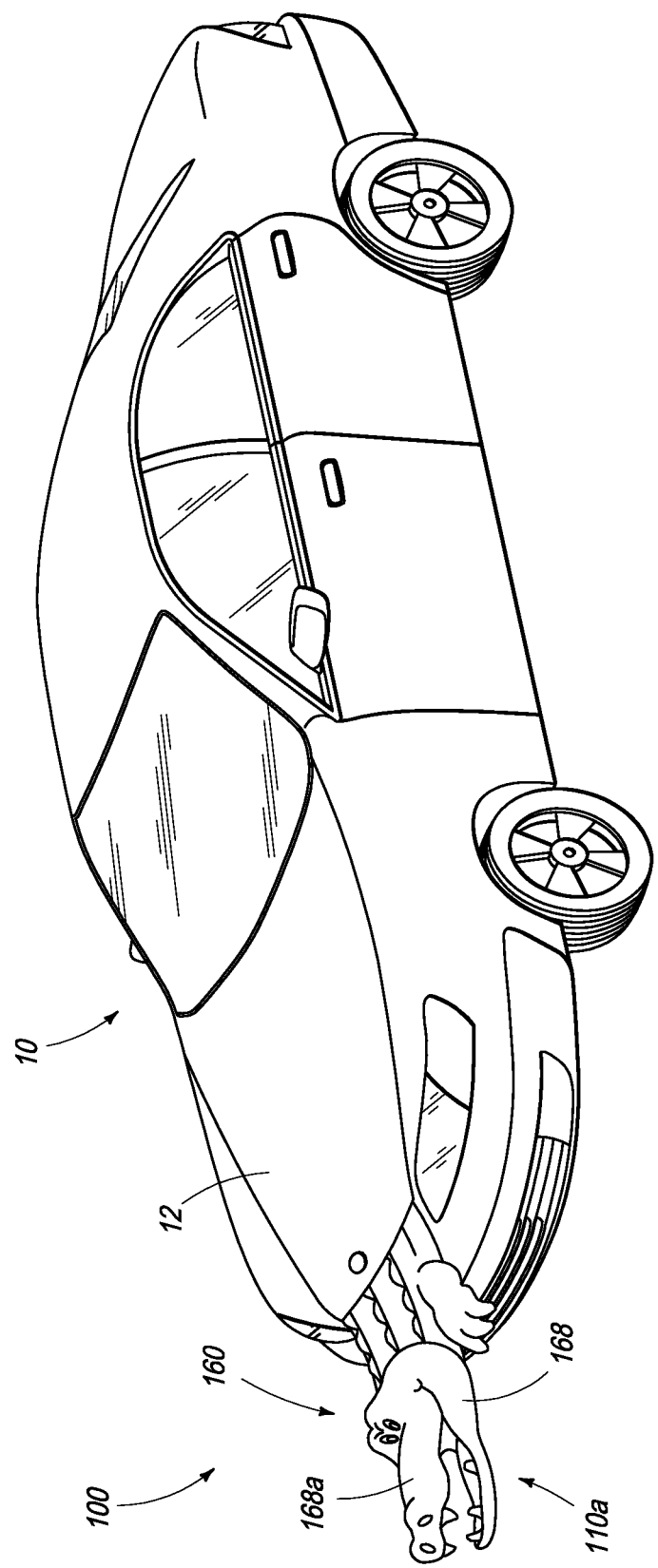
FIG. 1 is a perspective view of a forward section of a removable apparatus for ornamenting automobiles, according to an embodiment, in use coupled to an automobile.
Figure 2:
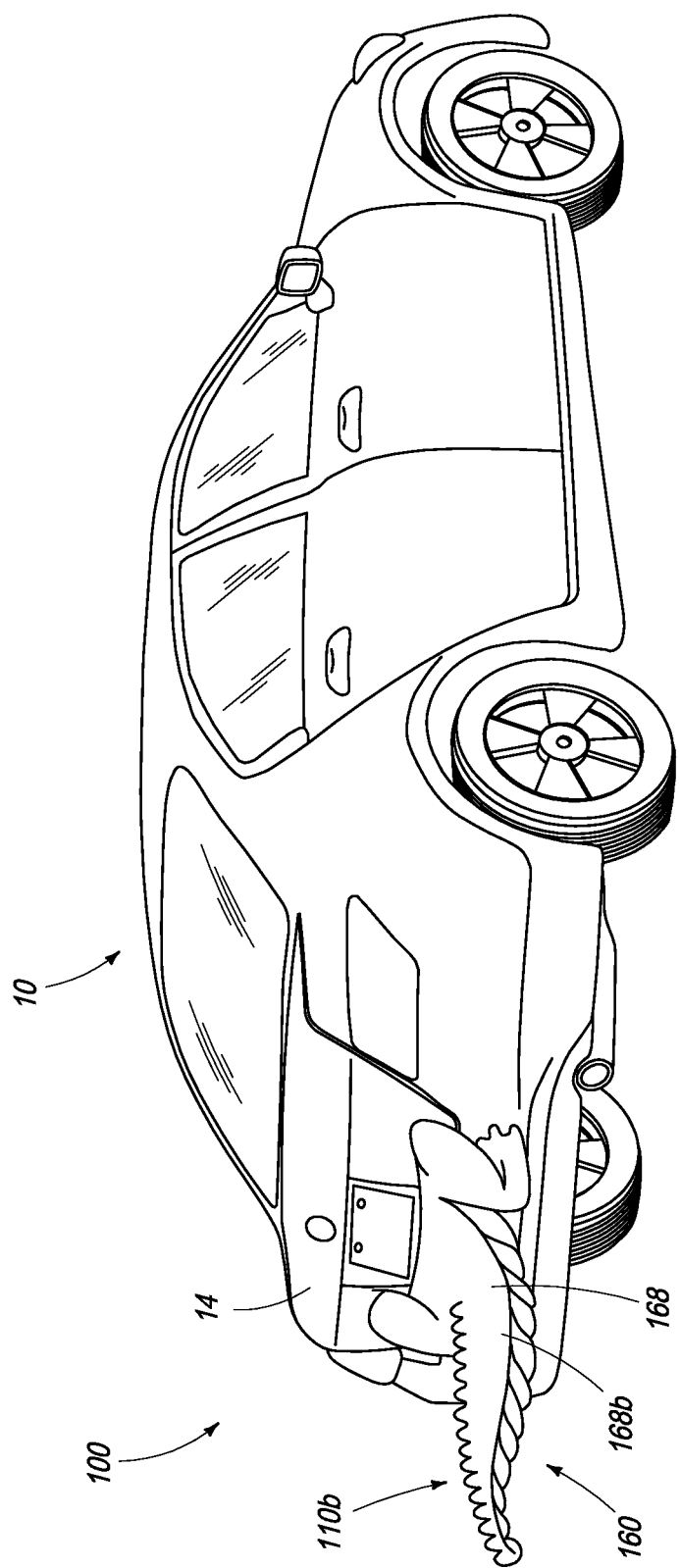
FIG. 2 is a perspective view of a rearward section of the removable apparatus for ornamenting automobiles, in use coupled to the automobile of FIG. 1.

FIGS. 1 through 3G illustrate a removable automobile-ornamenting apparatus 100 according to one embodiment. A forward section 110a of the apparatus 100 is specifically shown coupled to an automobile 10 in FIG. 1, and a rearward section 110b of the apparatus 100 is specifically shown coupled to the automobile 10 in FIG. 2. Both the forward section 110a and the rearward section 110b have an attachment portion 120 and an ornamental portion 160. In embodiment 100, the forward and rearward sections 110a, 110b differ from one another primarily by the respective ornamental portions 160 having different external configurations 168. The external configuration 168 of the forward section 110a in embodiment 100 is a forward portion of an alligator 168a, while the external configuration 168 of the rearward section 110b is a rearward portion of an alligator 168b. As those skilled in the art will appreciate, the external configurations 168a, 168b may vary greatly, and in some embodiments may be the same as one another.

Being generally the same as one another in embodiment 100, the attachment portion 120 of both the forward section 110a and the rearward section 110b is shown in FIGS. 3A through 3G. Each attachment portion 120 has a first arm 125 with proximal and distal ends 125a, 125b and a second arm 135 with proximal and distal ends 135a, 135b. The arms 125, 135 are configured for coupling the respective ornamental portions 160 to the automobile 10 through a friction fit. For example, the arms 125, 135 of the forward section 110a may have a length and shape to extend between a hood 12 of the automobile 10 and another portion of the automobile 10; the arms 125, 135 of the rearward section 110b may have a length and shape to extend between a rear door 14 of the automobile 10 and another portion of the automobile 10; and the arms 125, 135 may be compressible and resilient to aid the respective friction fits.

Figure 3A:
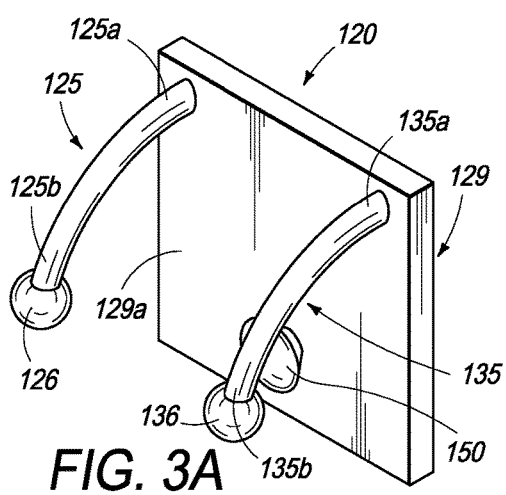
FIG. 3A is a perspective view of an attachment portion of the removable apparatus for ornamenting automobiles of FIG. 1 and FIG. 2.
Figure 3B:
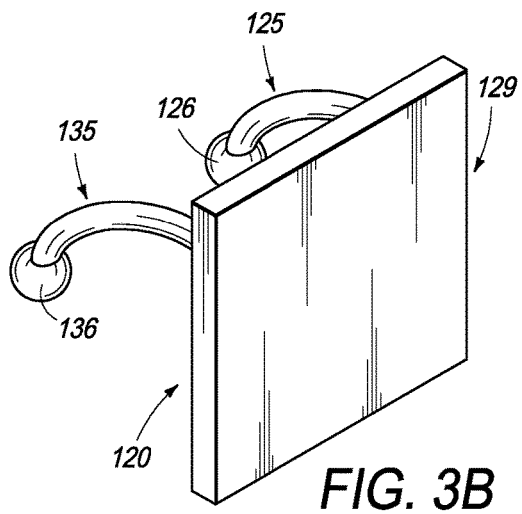
FIG. 3B is another perspective view of the attachment portion of FIG. 3A.
Figure 3C:
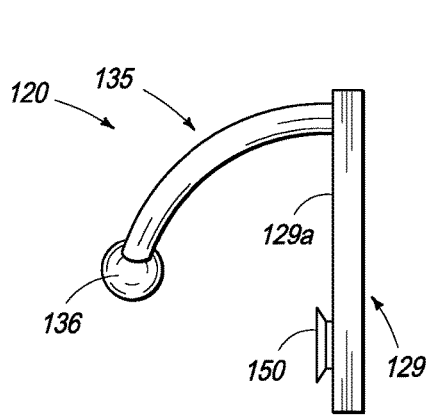
FIG. 3C is a side view of the attachment portion of FIG. 3A.
Figure 3D:
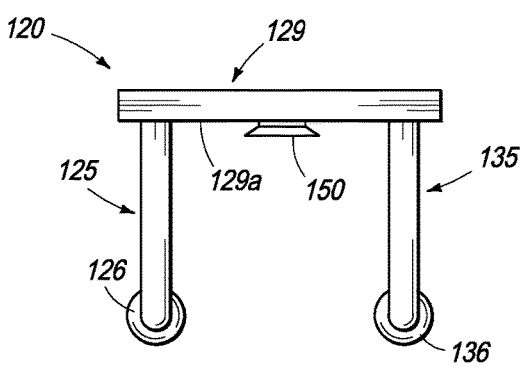
FIG. 3D is a top view of the attachment portion of FIG. 3A.
Figure 3E:
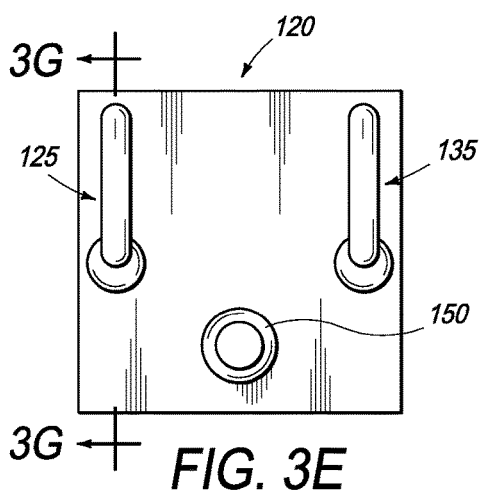
FIG. 3E is a front view of the attachment portion of FIG. 3A.
Figure 3F:
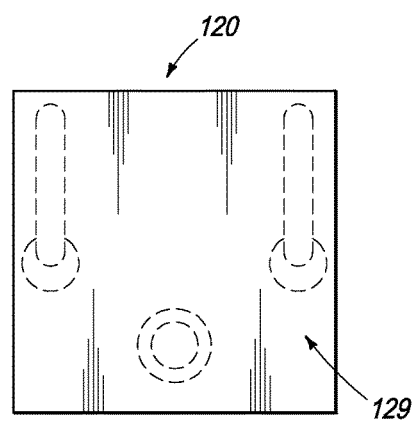
FIG. 3F is a rear view of the attachment portion of FIG. 3A.
Figure 3G:
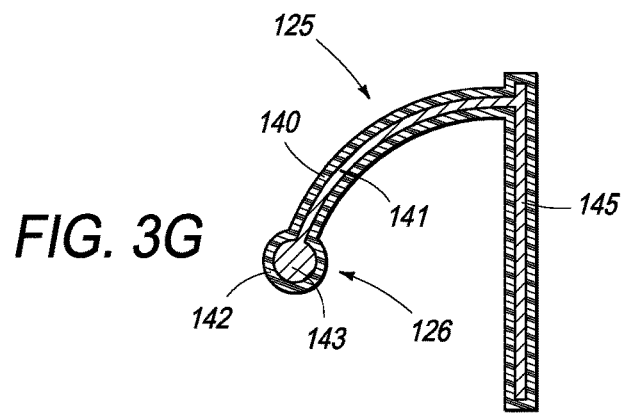
FIG. 3G is a section view taken from FIG. 3E.

Moreover, it may be desirable for the arms 125, 135 to be constructed of a non-marring material 140 to avoid damage to the vehicle 10. Various materials may accordingly be appropriate for the arms 125, 135, such as natural or synthetic rubber. And as shown in FIG. 3G, the arms 125, 135 may include metal 141 (e.g., metal wire, chain, etc.) encased by the external material 140 (e.g., rubber, etc.) to increase durability. In some embodiments, the metal 141 in the arms 125, 135 is coupled together (e.g., by metal plate 145) or is continuous.

An anchor 126 may extend from the first arm distal end 125a, and an anchor 136 may similarly extend from the second arm distal end 135a. The anchor 126 has a cross-sectional area sized to prevent the accompanying ornamental portion 160 from undesirably separating from the automobile 10 if the friction fit of the arm 125 is undesirably overcome, and the anchor 136 has a cross-sectional area sized to prevent the accompanying ornamental portion 160 from undesirably separating from the automobile 10 if the friction fit of the arm 135 is undesirably overcome. While the anchors 126, 136 are shown to be generally spherical, other configurations may alternately be used (e.g., cubic, cylindrical, irregular, et cetera).

As with the arms 125, 135, the anchors 126, 136 may be constructed of various materials—and particularly (though not necessarily) compressible, resilient, non-marring materials. In some embodiments, the anchors 126, 136 are formed with the arms 125, 135; and in other embodiments, the anchors 126, 136 are formed separately from and then coupled to the arms 125, 135. To increase durability, the anchors 126, 136 may include metal 143 encased by external material 142 as shown in FIG. 3G, and the metal 141 of the arms 125, 135 may extend to the metal 143.

The attachment portion 120 may further include a suction member 150. The suction member 150 may be a conventional suction cup as shown in the accompanying drawings, or may be an enhanced suction cup. One enhanced suction cup which may be utilized is disclosed in U.S. Pat. No. 7,810,777 to Paradise, the contents of which are incorporated herein in their entirety.

Although the attachment portion 120 of both sections 110a, 110b is generally the same in embodiment 100, various differences may occur in other embodiments. For example, dimensions and/or proportions may differ, or one attachment portion 120 may include a traditional suction cup for the suction member 150 while the other attachment portion 120 includes an enhanced suction cup or no suction member 150 at all, et cetera.

Turning now to the ornamental portions 160, each of the ornamental portions 160 respectively extends from an attachment portion 120. More particularly, each ornamental portion 160 of the embodiment 100 may be operatively coupled to the proximal ends 125a, 135a of the arms 125, 135 and to the suction member 150 of a respective attachment portion 120. In some embodiments, each ornamental portion 160 may include a metal core and the metal 141 of the arms 125, 135 may extend to the metal in the ornamental portion 160 (either directly or through an intermediary member). In the embodiment 100, the attachment portions 120 each include a wall 129 having an outer face 129a (FIG. 3A) from which arms 125, 135 extend, and the ornamental portions 160 may be coupled to the respective walls 129 (e.g., by adhesive, welding, bolts, or any other appropriate fastener) such that an interior face 169 of each ornamental portion 160 (shown in FIG. 8A) is generally planar with a respective outer face 129a. It may be particularly desirable for each outer face 129a to be constructed of rubber or another non-marring material to avoid damage to the vehicle 10 when in use. In other embodiments, the distinct walls 129 may be omitted and the ornamental portions 160 may be operatively coupled to the arms 125, 135 and the suction member 150 in different ways, such as by being formed unitary with the attachment portions 120.

The ornamental portions 160 may be constructed of any appropriate materials, and may include layers of various materials. For example, the ornamental portions may include rubber, plastic, wood, metal, or composite outside the metal core, or the metal core may be omitted.

The external configuration 168 of the forward section 110*a* may differ from the external configuration of the rearward section 110*b* as noted above, and both may vary greatly. For example, each external configuration 168 may be three dimensional and may be part or all of a mascot, an animal, a piece of sporting equipment, a pennant, an item of food, or a container for an item of food. It may be particularly desirable for the external configuration 168 of the forward section 110*a* to be three-dimensional and one of: a forward part (e.g., head, etc.) of a mascot, a forward part of an animal (including, for example, a head of a person), a forward part of an item of sporting equipment (e.g., a ball, hockey puck, bat, glove, racquet, etc.), a forward part of an item of food, or a forward part of a container for an item of food (e.g., a pizza box, et cetera). Similarly, it may be particularly desirable for the external configuration 168 of the rearward section 110*b* to be three-dimensional and one of: a rearward part (e.g., tail, hindquarters, etc.) of a mascot, a rearward part of an animal, a rearward part of an item of sporting equipment (e.g., a ball, hockey puck, bat, glove, racquet, etc.), a rearward part of an item of food, or a rearward part of a container for an item of food (e.g., a pizza box, et cetera).

Further, the external configuration of the sections 110, 110*b* may be complementary, such that forward and rearward parts of a mascot, animal, ball, etc. are used. For example, as noted above and shown in FIGS. 1 and 2, the external configuration 168 of the forward section 110*a* in embodiment 100 is a forward portion of an alligator 168*a*, while the external configuration 168 of the rearward section 110*b* is a rearward portion of an alligator 168*b*.

To use the automobile-ornamenting apparatus 100, the hood 12 and the rear door 14 of the automobile 10 are opened. The arms 125, 135 of the forward section 110*a* are placed under a forward edge of the hood 12 and the hood 12 is closed such that the ornamental portion 160 of the forward section 110*a* is coupled to the automobile 10 through the arms 125, 135 being friction fit between the hood 12 and another portion of the automobile 10. The suction member 150 of the forward section 110*a* may further attach the ornamental portion 160 of the forward section 110*a* to the automobile 10, and a ballast may be present in the attachment portion 120 and/or the ornamental portion 160 of the forward section 110*a* to bias the ornamental portion 160 from being undesirably moved upwardly. The arms 125, 135 of the rearward section 110*b* are placed between the rear door 14 and another portion of the automobile 10, and the rear door 14 is closed to create a friction fit with the arms 125, 135 and thereby couple the ornamental portion 160 of the rearward section 110*b* to the automobile 10. As with the forward section 110*a*, the suction member 150 of the rearward section 110*b* may further attach the ornamental portion 160 of the rearward section 110*b* to the automobile 10, and a ballast may be present in the attachment portion 120 and/or the ornamental portion 160 of the rearward section 110*b* to bias the ornamental portion 160 from being undesirably moved upwardly.

If, while the apparatus 100 is in use, the friction fit of the arms 125, 135 of the forward section 110*a* were to fail and the suction member 150 of the forward section 110*a* were to fail, the anchors 126, 136 of the forward section 110*a* may prevent the ornamental portion 160 of the forward section 110*a* from becoming completely separated from the automobile 10 since the anchors 126, 136 may be incapable of passing underneath the hood 12 without the hood 12 being opened. And if, while the apparatus 100 is in use, the friction fit of the arms 125, 135 of the rearward section 110*b* were to fail and the suction member 150 of the rearward section 110*b* were to fail, the anchors 126, 136 of the rearward section 110*b* may prevent the ornamental portion 160 of the rearward section 110*b* from becoming completely separated from the automobile 10 since the anchors 126, 136 may be incapable of passing outside the rear door 14 without the rear door 14 being opened.

To detach the forward section 110*a*, the hood 12 may be opened and the forward section 110*a* may be removed. And the rear door 14 may be opened to detach the rearward section 110*b*. Those skilled in the art will appreciate that the forward section 110*a* may be coupled to (or detached from) the automobile 10 either before or after the rearward section 110*b* is coupled to (or detached from) the automobile 10, and that the forward and rearward sections 110*a*, 110*b* may be used individually or together.

Figure 4:
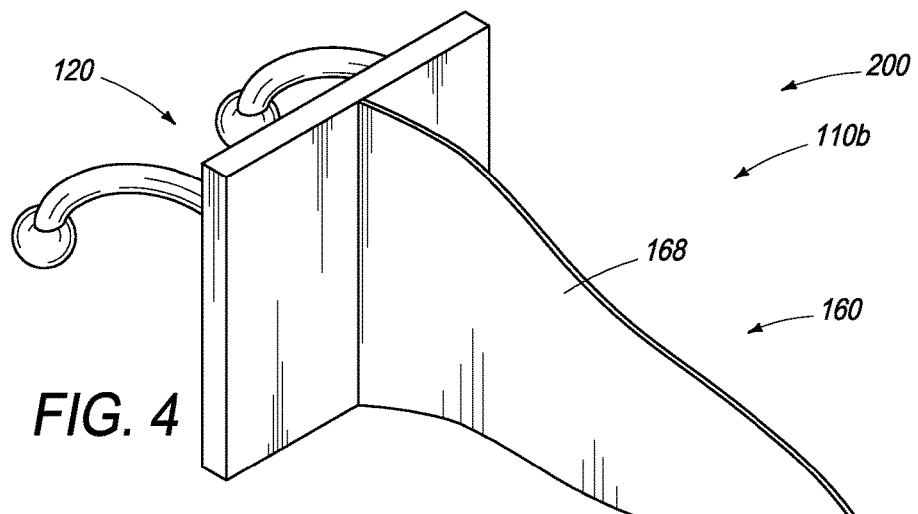
FIG. 4 is a perspective view of another removable apparatus for ornamenting automobiles, according to an embodiment.

FIG. 4 shows another automobile-ornamenting apparatus 200 that is substantially similar to the embodiment 100, except as specifically noted and/or shown, or as would be inherent. In embodiment 200, only the rearward section 110*b* is illustrated. The forward section 110*a* may be generally similar to the rearward section 110*b* or omitted, as discussed above in embodiment 100. Further, those skilled in the art will appreciate that the embodiment 100 (and thus the embodiment 200) may be modified in various ways, such as through incorporating all or part of any of the various described embodiments, for example. For uniformity and brevity, corresponding reference numbers may be used to indicate corresponding parts, though with any noted deviations.

The apparatus 200 primarily differs from the apparatus 100 shown in FIGS. 1 through 3G by having a different external configuration 168. Specifically, instead of being configured to resemble a portion of an alligator, the external configuration 168 in the apparatus 200 is generally that of a pennant.

Figure 5:
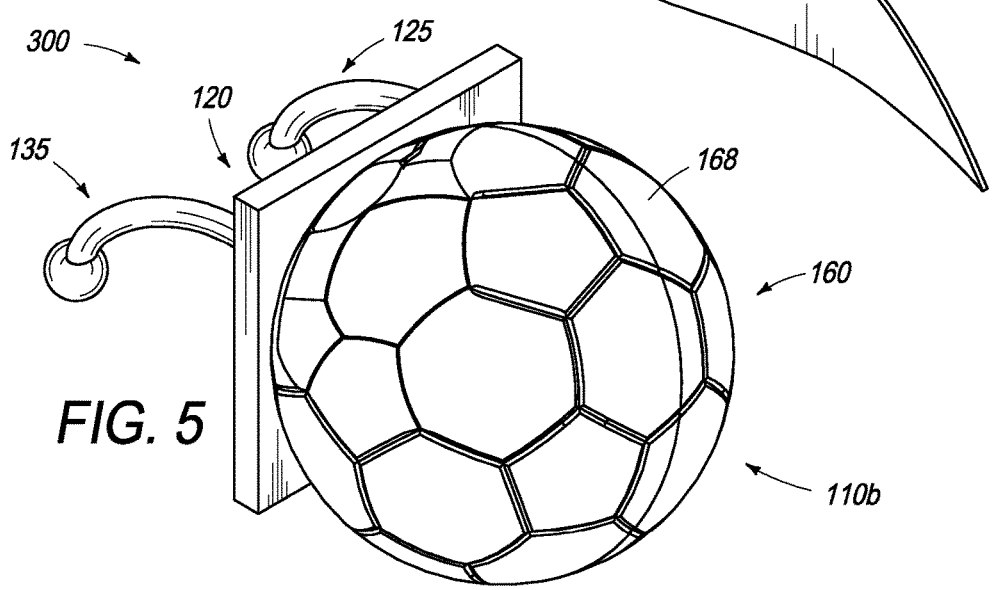
FIG. 5 is a perspective view of still another removable apparatus for ornamenting automobiles, according to an embodiment.

FIG. 5 shows another automobile-ornamenting apparatus 300 that is substantially similar to the embodiment 100, except as specifically noted and/or shown, or as would be inherent. In embodiment 300, only the rearward section 110*b* is illustrated. The forward section 110*a* may be generally similar to the rearward section 110*b* or omitted, as discussed above in embodiment 100. Further, those skilled in the art will appreciate that the embodiment 100 (and thus the embodiment 300) may be modified in various ways, such as through incorporating all or part of any of the various described embodiments, for example. For uniformity and brevity, corresponding reference numbers may be used to indicate corresponding parts, though with any noted deviations.

The apparatus 300 primarily differs from the apparatus 100 shown in FIGS. 1 through 3G by having a different external configuration 168. Specifically, instead of being configured to resemble a portion of an alligator, the external configuration 168 in the apparatus 300 is generally that of a soccer ball.

In embodiments such as embodiment 300 where an external configuration 168 may be acceptably oriented in various positions, the corresponding attachment portion 120 may be used in multiple ways. More particularly, in a first method of use, the arms 125, 135 of the attachment portion 120 may be located above the suction member 150 (and generally horizontal to one another) when the arms 125, 135 are between the rear door 14 and another portion of the automobile 10. And in a second method of use, the arms 125, 135 of the attachment portion 120 may be located below the suction member 150 (and generally horizontal to one another) when the arms 125, 135 are between the rear door 14 and another portion of the automobile 10. This may allow the apparatus 300 to be used with vehicles where it would be desirable to position the ornamental portion 160 generally below the friction fit as well as vehicles where it would be desirable to position the ornamental portion 160 generally above the friction fit. It may also allow a single section (e.g., rearward section 110b) to be interchanged between the hood 12 and the rear door 14 where it would be desirable to position the ornamental portion 160 generally below the friction fit on one end of the automobile 10 (e.g., at the hood 12) and generally above the friction fit on the other end of the automobile 10 (e.g., at the rear door 14).

FIGS. 6 through 10 show another automobile-ornamenting apparatus 400 that is substantially similar to the embodiment 100, except as specifically noted and/or shown, or as would be inherent. In embodiment 400, only the rearward section 110b is illustrated. The forward section 110a may be generally similar to the rearward section 110b or omitted, as discussed above in embodiment 100. Further, those skilled in the art will appreciate that the embodiment 100 (and thus the embodiment 400) may be modified in various ways, such as through incorporating all or part of any of the various described embodiments, for example. For uniformity and brevity, corresponding reference numbers may be used to indicate corresponding parts, though with any noted deviations.

Figure 7A:
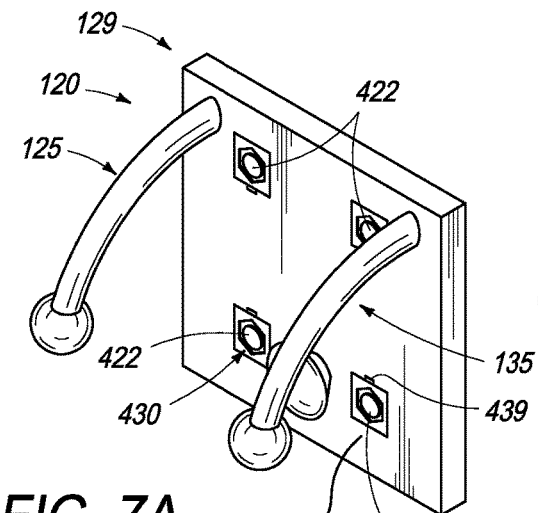
FIG. 7A is a perspective view of the attachment portion of the removable apparatus for ornamenting automobiles of FIG. 6, with an insert exploded for illustration.
Figure 7B:
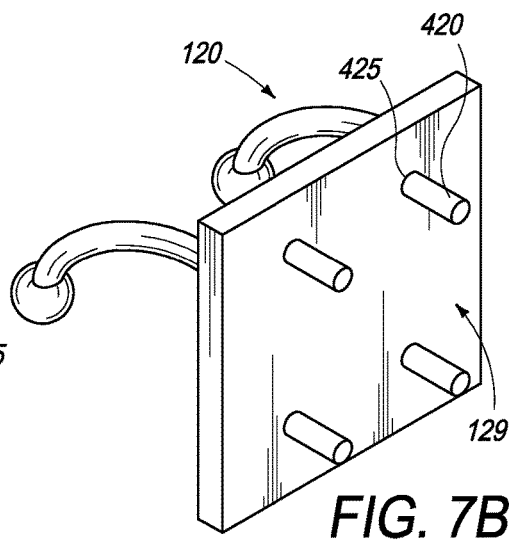
FIG. 7B is another perspective view of the attachment portion of FIG. 7A.
Figure 7C:
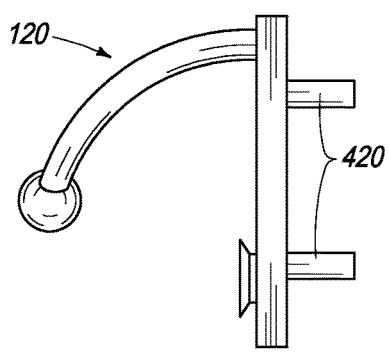
FIG. 7C is a side view of the attachment portion of FIG. 7A.
Figure 7D:
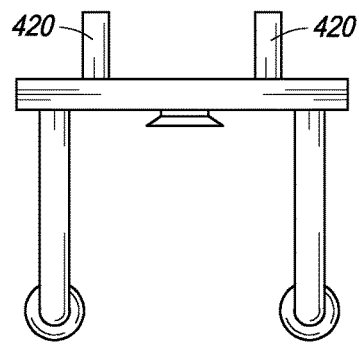
FIG. 7D is a top view of the attachment portion of FIG. 7A.
Figure 7E:
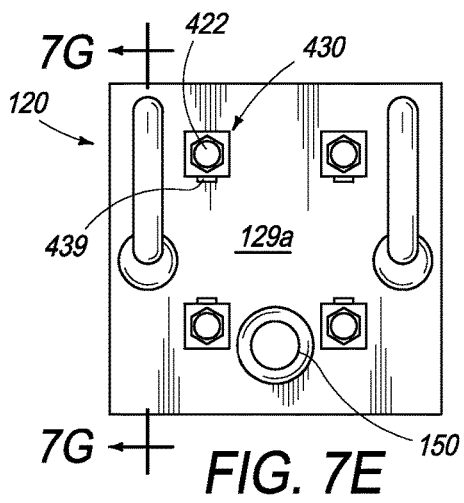
FIG. 7E is a front view of the attachment portion of FIG. 7A.
Figure 7F:
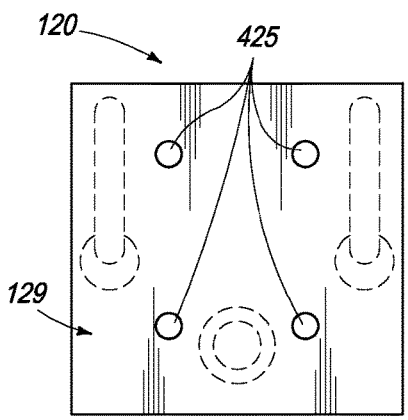
FIG. 7F is a rear view of the attachment portion of FIG. 7A.
Figure 7G:
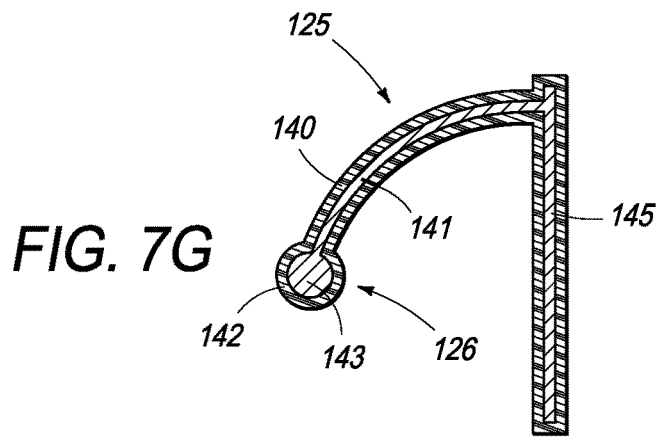
FIG. 7G is a section view taken from FIG. 7E.
Figure 8A:
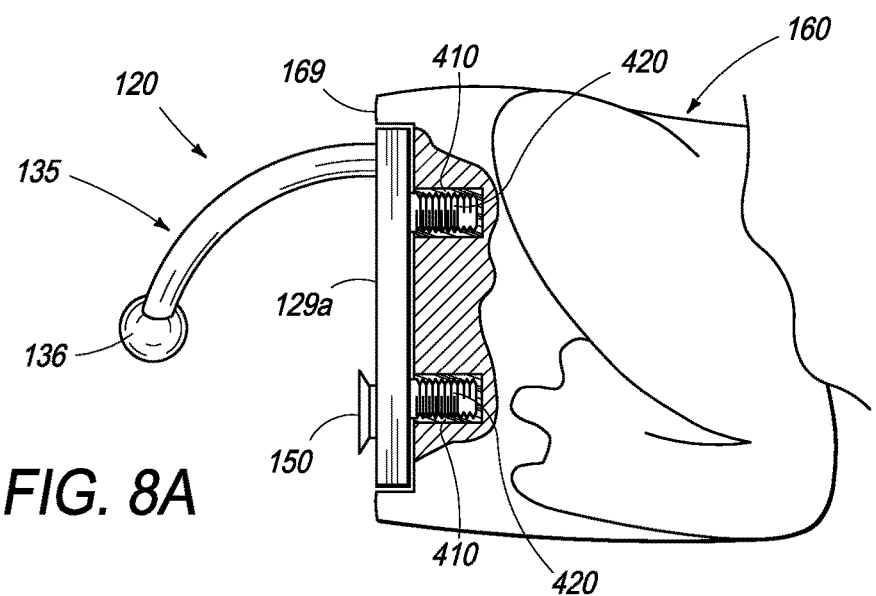
FIG. 8A is a sectional view of the rearward section of the removable apparatus for ornamenting automobiles of FIG. 6, showing one interaction between the attachment portion and the ornamentation portion when in use.
Figure 8B:
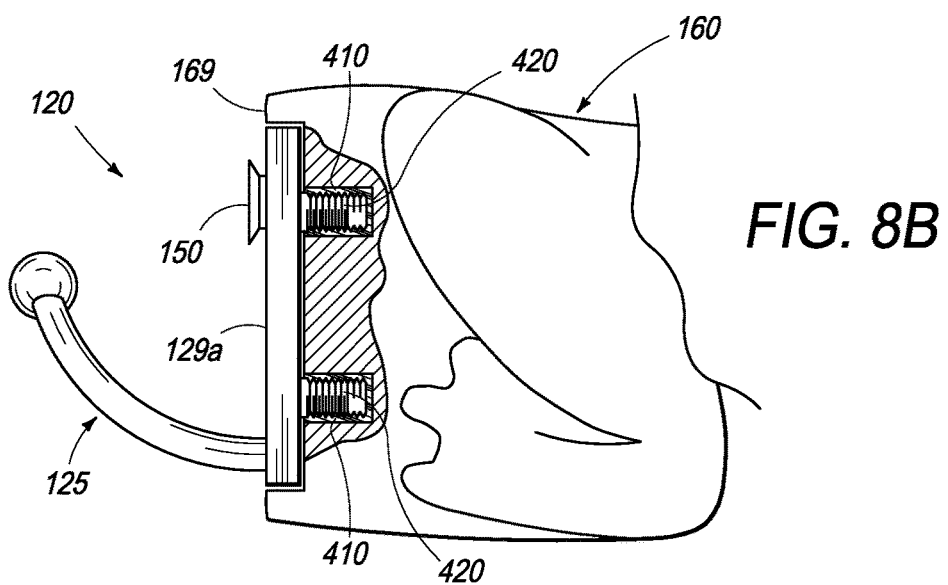
FIG. 8B is a sectional view of the rearward section of the removable apparatus for ornamenting automobiles of FIG. 6, showing another interaction between the attachment portion and the ornamentation portion when in use.

The apparatus 400 primarily differs from the apparatus 100 shown in FIGS. 1 through 3G by the attachment portion 120 being removably coupled to the ornamental portion 160. While various fasteners may be used, the embodiment 400 uses threaded fasteners to fix the outer face 129a generally planar with the interior face 169 (FIGS. 8A and 8B). Female threads 410 may be embedded in the ornamental portion 160, and bolts 420 may selectively couple the attachment portion 120 to the ornamental portion 160. As shown in FIGS. 7B and 7F, the bolts 420 may pass through holes 425 in the wall 129, and an area around the bolt heads 422 may be recessed to prevent the bolt heads 422 from extending beyond the outer face 129a when engaged with the female threads 410. In other threaded embodiments, at least one bolt may fixedly extend from the ornamental portion 160 and a nut may interact with the bolt to fasten the attachment portion 120 to the ornamental portion 160.

Inserts 430 accessible at the outer face 129a may be used to prevent the heads 422 of the bolts 420 from undesirably rotating and separating from the female threads 410. The inserts 430 may include a hole 432 or indentation complementary to the bolt heads 422 (e.g., hexagonal) and an external perimeter 434 shaped to prevent the inserts 430 from rotating relative to the wall 129. The inserts 430 may be friction fit to the wall 129 or may be coupled to the wall by a magnet or other fastener. Keyways 439 may be formed in the wall 129 to aid in removing the inserts 430 when desired.

Figure 9:
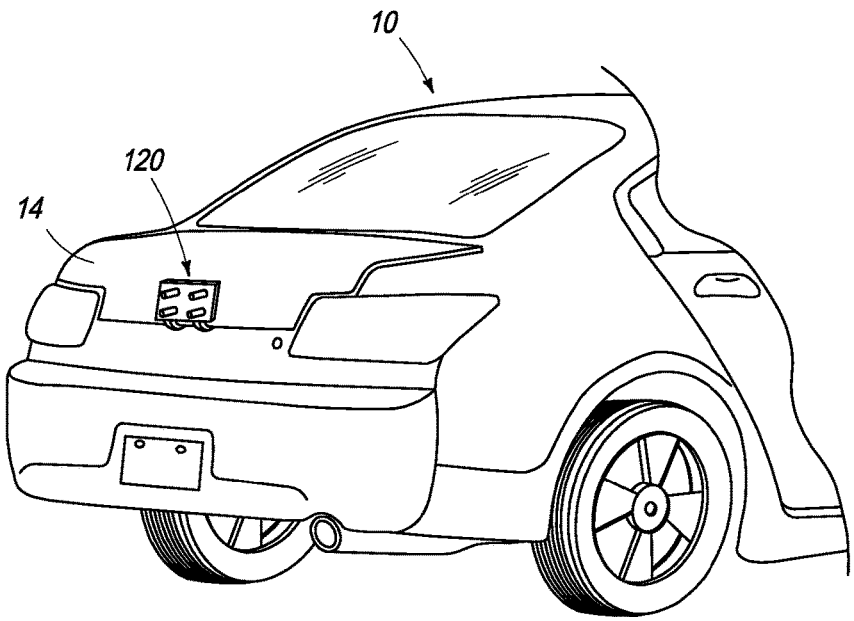
FIG. 9 is a perspective view of the attachment portion of FIG. 7A coupled to another automobile.
Figure 10:
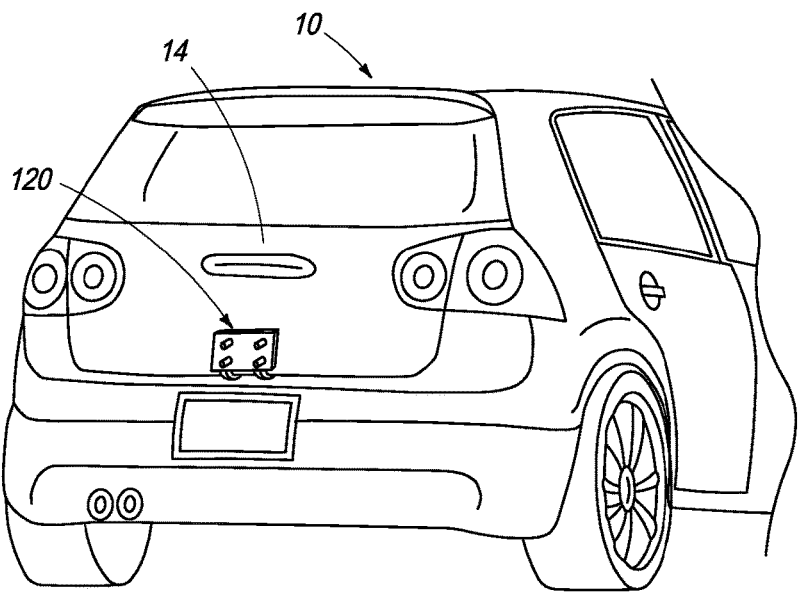
FIG. 10 is a perspective view of the attachment portion of FIG. 7A coupled to still another automobile.

Optional detachment of the ornamental portion 160 from the attachment portion 120 may have various benefits. For example, an ornamental portion 160 having a first external configuration 168 may be interchanged with another ornamental portion 160 having a different external configuration 168, without the need for an additional attachment portion 120. Optional detachment may also allow a single ornamental portion 160 to be used with automobiles 10 having various configurations, even if the external configuration 168 has only a single proper orientation. In other words, for a vehicle 10 such as shown in FIG. 6, where it is desirable for the wall 129 to extend downward from the arms 125,135, the ornamental portion 160 may be fastened to the attachment portion 120 so that the arms 125, 135 are above the suction member 150 (FIG. 8A); and for vehicles 10 such as shown in FIGS. 9 and 10, where it is desirable for the wall 129 to extend upward from the arms 125, 135, the ornamental portion 160 may be fastened to the attachment portion 120 so that the arms 125, 135 are below the suction member 150 (FIG. 8B). In both methods of attachment, the ornamental portion 160 may have generally the same orientation (i.e., "right side up") when in use with an automobile 10. Once the ornamental portion 160 is coupled to the attachment portion 120 as shown in either FIG. 8A or FIG. 8B, the embodiment 400 may function generally as described above in regard to embodiment 100 or embodiment 300.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention. It will be understood that certain features and subcombinations are of utility and may be employed without reference to other features and subcombinations and are contemplated within the scope of the claims. The specific configurations and contours set forth in the accompanying drawings are illustrative and not limiting.

We claim:

1. A removable automobile-ornamenting apparatus, comprising:
   an attachment portion comprising:
   a) a first attachment device having a first arm with proximal and distal ends;
   b) an anchor at the first arm distal end; and
   c) a second attachment device; and
   an ornamental portion operatively coupled to the first attachment device and the second attachment device;
   wherein the first attachment device and the second attachment device are configured such that:
   d) in a first method of use, the first arm is between a hood or a rear door of an automobile and a remainder of the automobile and the second attachment device is located below the first arm; and
   e) in a second method of use, the first arm is between the hood or the rear door of the automobile and the remainder of the automobile and the second attachment device is located above the first arm.

2. The removable automobile-ornamenting apparatus of claim 1, wherein the second attachment device includes a suction member.

3. The removable automobile-ornamenting apparatus of claim 2, wherein:
   the attachment portion further comprises:
   f) a third attachment device having an arm with proximal and distal ends, the third attachment device being operatively coupled to the ornamental portion; and
   g) an anchor at the distal end of the third attachment device arm; and the third attachment device is configured such that:
  h) in the first method of use, the first arm is generally horizontal with the third attachment device arm and the third attachment device arm is between the hood or the rear door of the automobile and the remainder of the automobile; and
  i) in the second method of use, the first arm is generally horizontal with the third attachment device arm and the third attachment device arm is between the hood or the rear door of the automobile and the remainder of the automobile.

4. The removable automobile-ornamenting apparatus of claim 3, wherein the attachment portion is removably coupled to the ornamental portion such that an orientation of the ornamental portion in the first method of use is generally the same as an orientation of the ornamental portion in the second method of use.

5. The removable automobile-ornamenting apparatus of claim 4, wherein:
  the attachment portion includes a wall having an outer face, the first arm and the third attachment device arm extending from the outer face; and
  the ornamental portion includes an interior face generally planar with the outer face when the attachment portion is coupled to the ornamental portion.

6. The removable automobile-ornamenting apparatus of claim 5, wherein the ornamental portion includes a three-dimensional external configuration selected from the group consisting of: a mascot head, a mascot tail, a ball, a puck, a glove, a pennant, an item of food, a front end of an animal, and a rear end of an animal.

7. The removable automobile-ornamenting apparatus of claim 5, wherein the ornamental portion includes a three-dimensional external configuration selected from the group consisting of: at least part of a mascot, at least part of an animal, at least part of an item of sporting equipment, at least part of an item of food, and at least part of a container for an item of food.

8. The removable automobile-ornamenting apparatus of claim 7, wherein:
  the first arm and the third attachment device arm are constructed of rubber; and
  the outer face of the attachment portion wall is non-marring.

9. A removable automobile-ornamenting apparatus, comprising:
  an attachment portion comprising:
    a) a first arm having proximal and distal ends;
    b) a first anchor at the first arm distal end;
    c) a second arm having proximal and distal ends;
    d) a second anchor at the second arm distal end; and
    e) a suction member;
  an ornamental portion operatively coupled to the first arm proximal end, the second arm proximal end, and the suction member; and
  a ballast in at least one item selected from the group consisting of the attachment portion and the ornamental portion;
  wherein the first arm and the second arm are respectively configured for coupling the ornamental portion to an automobile through a friction fit between:
    f) a hood or a rear door of an automobile; and
    g) another portion of the automobile;
  wherein the first anchor has a cross-sectional area sized to prevent the ornamental portion from undesirably separating from the automobile if the friction fit of the first arm is undesirably overcome;
  wherein the first arm and the first anchor are constructed of metal encased in a compressible, resilient, non-marring material;
  wherein the second arm and the second anchor are constructed of metal encased in a compressible, resilient, non-marring material;
  wherein the metal in the first arm extends to metal in the ornamental portion; and
  wherein the metal in the second arm extends to metal in the ornamental portion.

10. A removable automobile-ornamenting apparatus, comprising:
  an attachment portion comprising:
    a) a first arm having proximal and distal ends;
    b) a first anchor at the first arm distal end;
    c) a second arm having proximal and distal ends;
    d) a second anchor at the second arm distal end; and
    e) a suction member;
  an ornamental portion operatively coupled to the first arm proximal end, the second arm proximal end, and the suction member; and
  a ballast in at least one item selected from the group consisting of the attachment portion and the ornamental portion;
  wherein the first arm and the second arm are respectively configured for coupling the ornamental portion to an automobile through a friction fit between:
    f) a hood or a rear door of an automobile; and
    g) another portion of the automobile;
  wherein the first anchor has a cross-sectional area sized to prevent the ornamental portion from undesirably separating from the automobile if the friction fit of the first arm is undesirably overcome;
  wherein the second anchor has a cross-sectional area sized to prevent the ornamental portion from undesirably separating from the automobile if the friction fit of the second arm is undesirably overcome;
  wherein the attachment portion is removably coupled to the ornamental portion;
  wherein the attachment portion includes a wall having an outer face, the first arm and the second arm extending from the outer face; and
  wherein the ornamental portion includes an interior face generally planar with the outer face when the attachment portion is coupled to the ornamental portion.

11. The removable automobile-ornamenting apparatus of claim 10, wherein:
  the first arm and the first anchor are constructed of metal encased in a compressible, resilient, non-marring material;
  the second arm and the second anchor are constructed of metal encased in a compressible, resilient, non-marring material;
  the metal in the first arm extends to metal in the attachment portion wall; and
  the metal in the second arm extends to metal in the attachment portion wall.

* * * * *